United States Patent [19]

Arnold et al.

[11] 4,201,504
[45] May 6, 1980

[54] O-RING STACKING DEVICE AND METHOD

[75] Inventors: Robert A. Arnold; Raymond Warren, both of La Mirada, Calif.

[73] Assignee: Federal-Mogul Corporation, Southfield, Mich.

[21] Appl. No.: 896,320

[22] Filed: Apr. 14, 1978

[51] Int. Cl.² ............................................. B65G 57/03
[52] U.S. Cl. ..................................... 414/27; 209/906; 406/87; 414/786
[58] Field of Search ................. 214/6 D, 6 R, 8, 152, 214/DIG. 1; 302/2 R, 22; 209/619, 659, 688, 906; 198/953, 954; 414/27, 786, 908; 406/87, 139

[56] References Cited
U.S. PATENT DOCUMENTS

| | | | |
|---|---|---|---|
| 1,578,392 | 3/1926 | Cadden | 198/786 X |
| 2,214,814 | 9/1940 | Hambleton | 214/6 D |
| 2,760,679 | 8/1956 | Chadderton et al. | 198/953 X |
| 2,818,964 | 1/1958 | Picard et al. | 302/2 R X |
| 3,774,782 | 11/1973 | Lewis | 214/6 D |

Primary Examiner—L. J. Paperner
Attorney, Agent, or Firm—Harness, Dickey & Pierce

[57] ABSTRACT

An apparatus and method for collecting and stacking a plurality of torroidal-shaped articles by which the articles are introduced and entrained in a substantially laminar flow gas stream in which at least one collector member is removably disposed in intercepting relationship for collecting and stacking articles intercepted thereon in response to the movement of the articles past the collector member. The articles which are not intercepted are re-entrained in the gas stream and recirculated.

18 Claims, 6 Drawing Figures

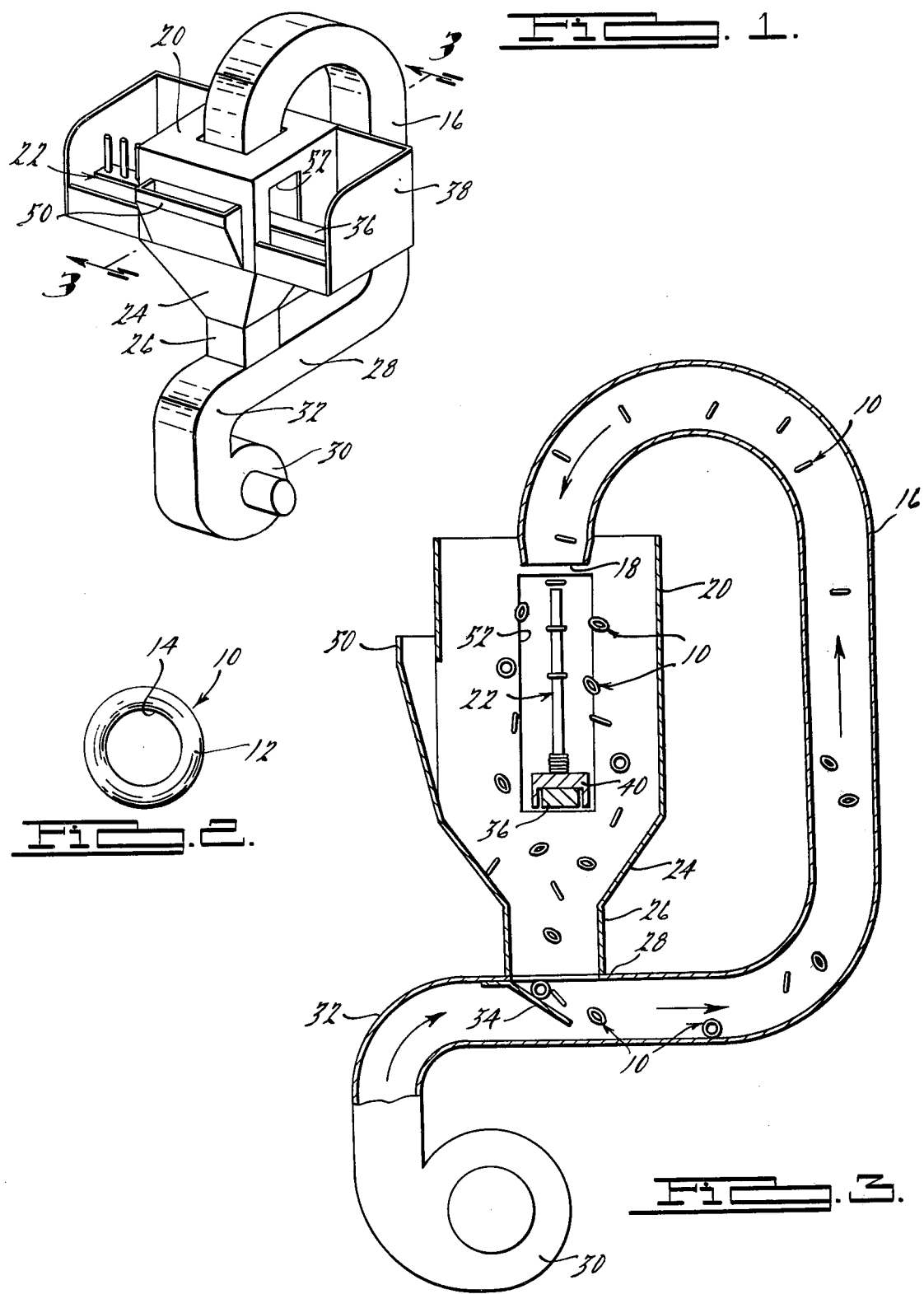

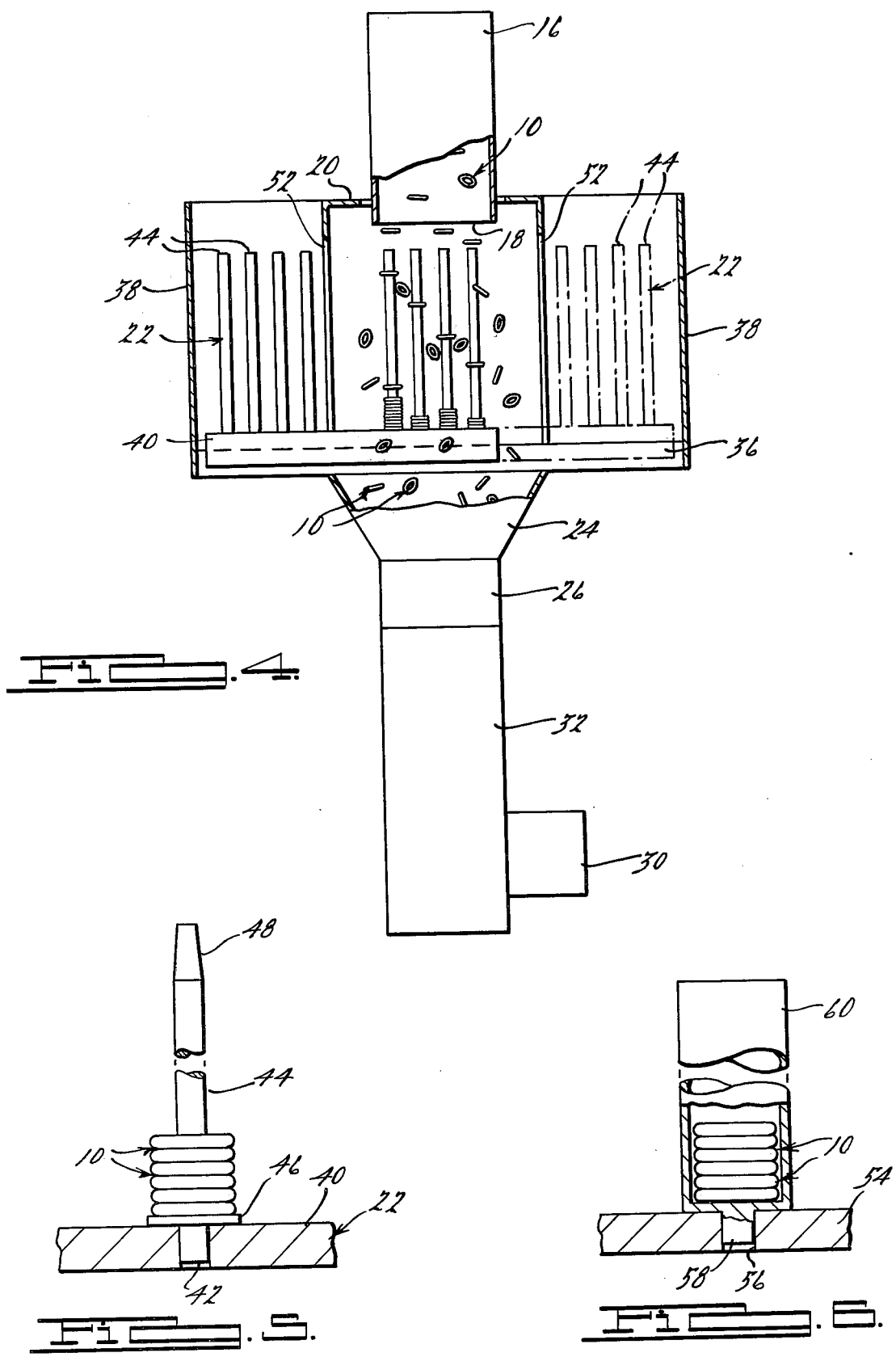

O-RING STACKING DEVICE AND METHOD

BACKGROUND OF THE INVENTION

A variety of manufacturing operations are presently in use by which vast quantities of small toroidal or ring-shaped articles are produced in bulk quantities. Typical of such processes is the manufacture of O-ring type seals which are of a variety of sizes and materials. Conventionally, such O-ring seals are produced in multiple cavity molds and are ejected from the mold after the completion of each molding cycle into a suitable storage hopper or bin. Such O-rings or like products are usually subjected to further processing to remove any flash which can conveniently be achieved in bulk form. Further materials handling of such small parts as required during inspection, labeling or coding such as by applying a color coding thereto, and ultimate packaging for shipment usually requires the O-rings or parts to be stacked to facilitate further handling.

It has heretofore been commonplace to manually sort and stack such small parts which comprises a tedious, time consuming and labor intensive operation. The apparatus and method of the present invention overcomes the problems associated with prior art manual material handling techniques of such small ring shaped parts by effecting an automatic collection and stacking of such parts in proper oriented relationship providing for improved efficiency and increased economy over techniques and devices heretofore known. The apparatus and method of the present invention is also adaptable for simultaneously effecting a sorting of a mixture of similar articles of different sizes.

SUMMARY OF THE INVENTION

The benefits and advantages of the present invention in accordance with the apparatus aspects thereof is achieved by a framework incorporating a duct thereon which is disposed in communication with a blower for passing a substantially laminar flow gas stream through the duct. An injector is employed for introducing the articles to be collected into the gas stream for entrainment therein and travel past a collector assembly incorporating at least one collector member thereon which is positioned with the upstream end thereof in intercepting and substantially parallel relationship with respect to the direction of flow of the gas stream and the articles therein. The collector member is adapted to intercept articles which are aligned with the collector member effecting a stacking thereof on the member which is removably mounted enabling extraction thereof from the duct and replacement with a second empty collector member to continue the collection and stacking operation. The duct is so arranged that the non-intercepted articles are recycled to the injector whereby they are again re-entrained in the gas stream. The apparatus further includes a hopper for introducing new articles into the duct system to replenish those collected by the collector member.

In accordance with the method aspects of the present invention, a collection and stacking of toroidal-shaped articles having a central opening therethrough is achieved by entraining the articles in a substantially laminar flow gas stream in a manner to induce orientation of the articles with the major dimension thereof in a plane substantially perpendicular to the direction of flow of the gas stream. A collector member is interposed in intercepting relationship in the gas stream with its upstream end portion disposed substantially parallel to the direction of flow of the gas stream. A portion of the articles thus entrained are intercepted and stacked on the collector member while the remaining articles are recirculated by the gas stream.

Additional benefits and advantages of the present invention will become apparent upon a reading of the description of the preferred embodiments taken in conjunction with the accompanying drawings.

BRIEF DESCRIPTION OF THE DRAWINGS

FIG. 1 is a perspective view of an apparatus constructed in accordance with the preferred embodiments of the present invention;

FIG. 2 is a plan view of a typical torroidal-shaped article such as an O-ring adapted for collection and stacking by the apparatus shown in FIG. 1;

FIG. 3 is a vertical transverse sectional view through the apparatus shown in FIG. 1;

FIG. 4 is a front elevational view partly in section of the apparatus as shown in FIGS. 1 and 3;

FIG. 5 is an enlarged fragmentary front elevational view partly in section of a collector rod for collecting and stacking articles; and FIG. 6 is a magnified front elevational view partly in section of a tubular collector member in accordance with an alternative embodiment of the present invention.

DESCRIPTION OF THE PREFERRED EMBODIMENTS

Referring now in detail to the drawings, and as may be best seen in FIGS. 1, 3 and 4, an apparatus is shown incorporating the preferred embodiments of the present invention for collecting torroidal or ring shaped articles on a suitable collector member in stacked relationship. The apparatus shown is particularly applicable, but not necessarily restricted to the collection and stacking of O-rings such as the O-ring 10 illustrated in FIG. 2. Typically, such O-ring seals are comprised of an elastomeric material such as synthetic rubber, for example, and the annulus 12 thereof is usually of a circular cross section. The O-ring is further provided with a central aperture or opening 14 therethrough. O-rings of the foregoing type are manufactured in large bulk quantities in a variety of different sizes and materials to meet a myriad of design specifications. It will be appreciated, that the apparatus and method as herein disclosed is also applicable for sorting and stacking alternative torroidal articles which are of sufficient strength and resistant to attrition and are capable of becoming entrained in a high velocity air stream as employed in the practice of the present invention.

Referring now to FIGS. 1, 3 and 4 of the drawings, the apparatus as shown includes a circular or loop-shaped duct 16 having a discharge end 18 thereof disposed in communication with the upper portion of a collection chamber 20 in which a collector assembly 22 is removably mounted. The lower portion of the collection chamber is disposed in communication with a tapered or hopper section 24 which is connected at its base to a recirculation duct section 26 disposed in communication with the inlet end section 28 of the loop-shaped duct 16. The loop-shaped duct 16, collection chamber 20, hopper section 24 and duct section 26 define in combination a continuous loop through which articles 10 such as the O-ring 10 (FIG. 2) are adapted to be circulated for progressive collection and stacking on the collector assembly 22.

A blower assembly 30 is connected at its outlet end to a L-shaped discharge conduit 32 for discharging a high velocity air stream into the inlet end section 28 of the loop-shaped duct. A baffle plate 34 is interposed at the junction of the discharge conduit 32 and the inlet section 28 to form a venturi which serves the dual function of locally increasing the velocity of the gas or air stream to effect an entrainment of the articles into the air stream as well as to produce a reduced pressure in the region of the outlet of the duct section 26 tending to draw the articles 10 downwardly into the inlet section of the duct. The foregoing arrangement provides for an injection and entrainment of the articles in the gas stream and the configuration and curvature of the duct 16 is such as to promote a substantially laminar flow of the gas stream at least in the vicinity of the discharge end 18 of the duct which tends to orient the articles 10 with the major dimension thereof disposed in a plane substantially perpendicular to the direction of travel of the air stream. In so doing, the articles are oriented to a higher magnitude in a position in which they can more readily be intercepted by the collector assembly as opposed to a random and tumbling orientation as occasioned in an extremely turbulent air stream.

The blower assembly 30 is preferably of a variable speed type to enable controlled variations in the quantity and velocity of the air discharged into the duct system to achieve optimum injection and entrainment of the articles and the attainment of a laminar flow pattern consistent with the size, density and specific configuration of the articles being processed. In this connection, sections of the several duct sections and collection chamber can be provided with viewports for visually observing the condition of flow and travel of the articles therethrough.

In the specific embodiment illustrated in FIGS. 1, 3 and 4, the apparatus includes a rail or track 36 extending transversely through the collection chamber 20 and projecting there beyond to a position laterally of each side thereof. The lateral portions of the rail 36 are enclosed by an open bin-shaped frame 38 mounted on each side of the collection chamber. The collector assembly 22 is adapted to be slidably mounted on the rail 36 for reciprocating movement therealong from a position as shown in solid lines in FIG. 4 to a position as shown in phantom. In the specific arrangement as shown in FIGS. 3, 4 and 5 the collector assembly 22 comprises an elongated base 40 which is of an inverted U-shaped cross section and is adapted to overlie the upper surface and side edges of the rail 36. The base 40 is formed with a plurality of apertures 42 therein for removably receiving the lower end portions of collector rods 44. The apertures and collector rods 44 as shown in FIG. 4 are arranged in two groups of 4 rods each disposed in longitudinally spaced relationship and the length of the base 40 is such that one group of rods is disposed within the collection chamber in vertical alignment with the discharge end 18 of the loop-shaped duct while the other group of rods is positioned in the left or right hand bin 38. Accordingly, while one group of collector rods is in position for intercepting and collecting articles circulated through the duct system, the other group of collector rods are accessible to an operator for removing the rods having the stacked columns of articles thereon and for replacement of the filled rods with empty rods. After the rods within the collection chamber become filled, the entire collector assembly is moved from the position as shown in solid lines to the position shown in phantom in FIG. 4 in which this step is repeated.

As best seen in FIG. 5, the base of each collector rod 44 is preferably provided with an annular flange 46 on which the lowermost article is supported thereby retaining the stacked column of articles on the rod during subsequent handling operation such as further processing, inspection, color coding or marking, and eventual packaging. It is also contemplated that the upper end portion of each of the collector rods 44 can be provided with a taper indicated at 48 in FIG. 5 to facilitate alignment of the central opening in the article with the rod increasing the probability of interception of the articles. The use of such a taper 48 is conventionally restricted to such instances in which all of the articles being processed are of substantially the same size having the same central opening. In such instances in which the articles being processed are of variable size having variable diameter central openings, the diameter of the end portion of the rod serves to selectively sort and collect only those articles having a diameter at least as large as the diameter of the collector rods. In such instance, it is usually the practice to first employ collector rods of a diameter corresponding to the largest opening of the mixed articles whereby all of such articles will be selectively collected while the balance will be recirculated. Thereafter collector rods of a selective smaller diameter in progressive steps are employed to selectively collect and stack the remaining articles in accordance with size.

It will be apparent that as the apparatus operates, articles will be progressively extracted from the air stream and collected in stacked relationship on the collector assembly. A periodic or continuous automatic or manual replenishment of the articles collected can appropriately be achieved by a feed mechanism including a loading chute 50 formed in the collector chamber for loading supplemental articles into the tapered hopper section 24 and recirculating duct section 26 of the duct system. In addition to the loading chute 50, the collection chamber is further provided with ports or openings 52 on each side thereof through which the rail 36 extends and which is of a size sufficient to clear the collector assembly during its reciprocating travel to and from a loading and an unloading position. The ports 52 can suitably be closed at the completion of the shuttle travel of the collector assembly by means of a suitable flexible door or membrane (not shown) to minimize inadvertent escape of articles from the duct system.

Referring now to FIG. 6 of the drawings, an alternative embodiment of a collector assembly is illustrated fragmentarily which similarly comprises a base 54 formed with a plurality of apertures 56 in longitudinally spaced relationship therealong for receiving a correspondingly shaped projection 58 connected to the base of a collector member comprising a collector tube 60. In accordance with this alternative embodiment, the internal diameter of the collector tube 60 is selected to correspond with the diameter of the periphery of the articles being processed whereby they similarly are intercepted and collected in stacked relationship when the articles are disposed in appropriate spatial aligned relationship with the open end of the collector tube 60. By varying the diameter of the collector tubes, a sorting function can also be performed by the apparatus of articles of different diameter initially employing tubes of a size corresponding to the smallest articles and progressively increasing in size to the largest article being processed.

Of the two collector assembly embodiments illustrated and disclosed, the collector assembly as depicted in FIGS. 3, 4, and 5 constitutes a preferred embodiment in that the stacked articles are arranged with their peripheries exposed for further processing inspection marking etc. upon removal from the collector assembly.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A method for collecting and stacking a plurality of torroidal-shaped articles of substantially shape-retaining structure having a central opening therethrough which comprises the steps of entraining the articles in a substantially laminar flow gas stream in a manner to induce orientation of the major dimension of said articles in a plane substantially perpendicular to the direction of flow of said gas stream, interposing a collector member in intercepting relationship in said gas stream with its upstream end portion disposed substantially parallel to the direction of flow of said gas stream, collecting and stacking intercepted articles on said collector member, and re-entraining and recirculating the remaining articles in said gas stream.

2. The method as defined in claim 1 including the further step of removing said collector member after accumulation of a stacked column of intercepted articles thereon and replacing said collector member with an empty second collector member.

3. The method as defined in claim 1 including the further steps of removing said collector member after accumulation of a stacked column of intercepted articles thereon and subjecting said articles to further processing while disposed in stacked relationship on said member.

4. The method as defined in claim 1 including the further step of positioning a plurality of said collector members in intercepting relationship in said gas stream.

5. The method as defined in claim 1 in which said collector member is in the form of a rod and including the further step of controlling the diameter of said collector rod to selectively collect articles having a central opening of a size at least greater than said rod.

6. The method as defined in claim 5 including the further step of tapering the upstream end portion of said collector rod to facilitate interception of said articles.

7. The method as defined in claim 1 including the further step of introducing additional articles into said gas stream to replenish the articles collected.

8. The method as defined in claim 1 including the further step of orienting the upstream end portion of said collector member and the direction of flow of the gas stream in the vicinity of said collector rod in a substantially vertical position.

9. The method as defined in claim 1 in which said collector member is in the form of a tube and including the further step of controlling the inside diameter of said collector tube to selectively collect articles of a size less than the size of said tube.

10. An apparatus for collecting and stacking a plurality of torroidal-shaped articles of substantially shape-retaining structure having a central opening therethrough comprising duct means, blower means for passing a substantially laminar flow gas stream through said duct means, injector means for introducing said articles into said gas stream for entrainment therein, a collector assembly including at least one collector member removably disposed in intercepting relationship in said duct means with the upstream end portion of said collector member disposed substantially parallel to the direction of flow of said gas stream for collecting and stacking intercepted articles, and recirculating means disposed downstream of said collector assembly for recirculating the non-intercepted articles to said injector means.

11. The apparatus as defined in claim 10 in which said collector member comprises a rod of a size and configuration substantially corresponding to the central opening of the articles to be collected.

12. The apparatus as defined in claim 10 in which said collector member comprises a tube having an internal bore of a size and configuration corresponding substantially to the periphery of the articles to be collected.

13. The apparatus as defined in claim 10 wherein said duct means includes a collection chamber in communication with said duct means, and support means in said collection chamber for removably supporting said collector assembly in said gas stream.

14. The apparatus as defined in claim 13 in which said support means comprises a rail on which said collector assembly is slidably mounted for movement to and from a position within said collection chamber and a position exteriorly thereof.

15. The apparatus as defined in claim 14 in which said collector assembly comprises a base slidably mounted on said rail and a plurality of collector members removably mounted on said base.

16. The apparatus as defined in claim 10 further including feed means for introducing additional articles into said duct means to replenish the articles collected.

17. The apparatus as defined in claim 10 in which said duct means is in the form of a substantially continuous loop through which said air stream and the articles entrained therein are circulated past said collector assembly.

18. The apparatus as defined in claim 10 in which said duct means is in the form of a continuous loop and said injector means includes a conduit connected to said blower means for discharging high velocity gas into said duct means in a manner to effect entrainment of the articles therein.

* * * * *